United States Patent Office 3,044,878
Patented July 17, 1962

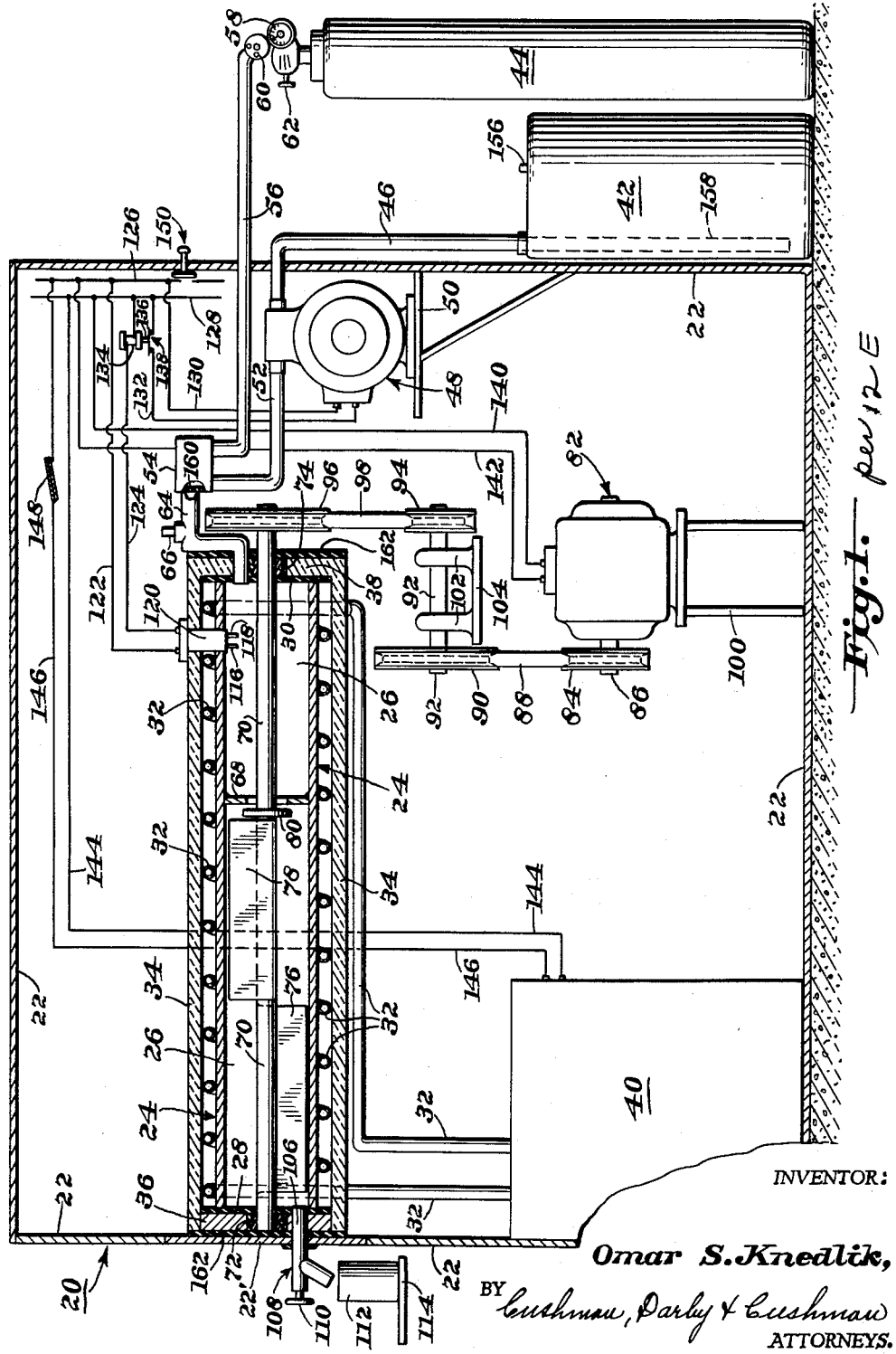
July 17, 1962  O. S. KNEDLIK  3,044,878
PROCESS FOR THE PREPARATION OF A BEVERAGE
Filed July 18, 1958
INVENTOR:
Omar S. Knedlik,
BY Cushman, Darby & Cushman
ATTORNEYS.

3,044,878
PROCESS FOR THE PREPARATION OF A
BEVERAGE
Omar S. Knedlik, 1505 W. 8th St., Coffeyville, Kans.
Filed July 18, 1958, Ser. No. 749,392
6 Claims. (Cl. 99—28)

This invention relates to beverages, and methods and apparatus for their preparation and dispensing. More particularly, it relates to carbonated beverages of the so-called "soft drink" variety.

Carbonated soft drinks, presently on the market, are composed of a flavoring substance, such as a liquid syrup or fruit concentrate, water and a carbonating gas, the carbonating gas commonly being carbon dioxide. In dispensing such drinks, particularly in commercial establishments, it is conventional practice to utilize ice in the beverage in the drinking container to maintain the beverage at a desirably low temperature. As is evident, this procedure involves the disadvantage that the beverage product becomes diluted as the ice melts, and further, such melting of the ice may result in acceleration of the escape of gases contained in the drink. Understandably, the overall taste of the product will be considerably impaired.

Accordingly, in order to overcome the foregoing and other disadvantages of the prior art, the main objective of the present invention is to provide a novel carbonated beverage or soft drink of optimum concentration and temperature involving a liquid and frozen particles and capable of retaining a uniform concentration during melting of the frozen particles.

It is contemplated that the carbonated soft drink of the invention comprise a mixture of $H_2O$ and a flavoring substance existing in both the liquid and solid phases wherein each phase includes some $H_2O$, as well as some of the flavoring substance. The proportions of the $H_2O$ and flavoring substance in both phases are substantially the same whereby as the solid phase melts to the liquid phase, there will be no change in the concentration of the drink.

Another important object of the invention resides in the provision of a novel process for preparing and dispensing carbonated beverages of superior qualities. More specifically, it is desired to provide a novel process for preparing a carbonated soft drink beverage in a closed chamber involving agitation of the drink under ideal temperature conditions for carbonation and under a superatmospheric pressure condition created by the carbonating gas itself. A related object is to have temperature, pressure and other conditions in the chamber so controlled and of such character that as the drink is dispensed from the chamber and into a container open to the atmosphere some of it will freeze or crystallize, with the frozen particles or crystals being of substantially the same concentration and flavor as the liquid phase of the drink.

A further object relates to the provision of a continuous process for the preparation and dispensing of chilled carbonated soft drinks of maximum carbonation and uniform concentration.

In accordance with broad aspects of the invention, it is contemplated that a carbonated liquid beverage be provided in a closed chamber with the temperature of the beverage being lowered at least to its freezing point while maintaining said beverage in the liquid state in said chamber. The beverage is maintained in the liquid state in this chamber by reason of a superatmospheric pressure existing in the chamber and also by agitating the beverage. The process of the invention further contemplates dispensing or tapping the beverage from the closed chamber and automatically providing for the replacement in the chamber of an amount of beverage equivalent to that dispensed or tapped therefrom whereby the process may be continuous in operation.

The process thus enables a beverage to be brought to a temperature at or below its normal freezing point while remaining in a liquid state prior to dispensing, whereby upon dispensing the beverage, some of it will immediately freeze or crystallize to form a soft drink involving a liquid and a solid phase, the solid phase comprising substantially the same proportions of flavoring substance and $H_2O$ as the liquid phase. This spontaneous freezing is believed to be due to the low temperature of the product, the release of pressure on the product as it enters the atmosphere, and possibly also to the escape of some gases from within the product.

In a somewhat more specific aspect, it is contemplated by the method of the invention that a flavored liquid drink and a carbonating gas at superatmospheric pressure be delivered into a closed chamber and be agitated and mixed therein with the amount of carbonating gas introduced into the chamber being in excess of the amount necessary to completely carbonate the liquid whereby the liquid will be in a highly carbonated condition and the remainder of the carbonating gas will provide a superatmospheric pressure within the closed chamber.

A still further object of the invention is to design novel apparatus for performing the process of the invention discussed heretofore, and particularly adapted to operate automatically and continuously to provide a constant supply of a soft drink of uniform and optimum concentration, temperature and carbonation.

The apparatus, in general, includes a closed vessel defining a hermetically sealed chamber with means being provided for introducing a flavored liquid and a carbonating gas into the chamber. Cooling means are arranged to chill the liquid within the chamber and control means are provided for regulating the temperature and for automatically regulating the amount of flavored liquid within the chamber and for replenishing the supply of liquid therewithin after a dispensing operation.

Further objects and advantages of the invention will be in part obvious and in part pointed out hereinafter.

The novel features of the invention may be best made clear from the following description and accompanying drawings in which The drawing is a fragmentary and partially sectioned elevational view of an apparatus embodying the invention.

In an exemplary embodiment of the invention, there is provided a process of preparing and dispensing a carbonated soft drink wherein a flavored liquid and a carbonating gas are delivered into a closed and hermetically sealed chamber. The flavored liquid may be of any appropriate character, for example, it may comprise a mixture of a flavoring substance, water, and carbonating gas. The flavoring substance and water preferably are premixed to the desired concentration before being delivered into the chamber. The carbonating gas used is $CO_2$ and preferably it is delivered to the closed chamber at a substantially constant and predetermined superatmospheric pressure, for example, 12 to 18 p.s.i.g.

In this embodiment, the flavored liquid and carbonating gas may be brought together or mixed before delivery into the closed chamber, or they may be delivered to the closed chamber separately with no mixing thereof taking place externally of this chamber. The flow of flavored liquid into the chamber is controlled so that the amount therein may be predetermined and held constant.

Within this chamber, the flavored liquid and carbonating gas are agitated and chilled to promote carbonation. The amount of carbonating gas within the chamber preferably is in excess of the amount necessary for complete carbonation of the liquid, resulting in the creation of a pressure head or superatmospheric condition within the chamber. The chilling of the material in the chamber is so controlled that the temperature of the carbonated beverage will be lowered at least to its freezing point. By way of example, the freezing point of the carbonated beverage may be approximately 32° F. and the temperature of the beverage within the closed chamber will be reduced to this value or a lower temperature, for example, 28.5° F. or anywhere between about 28.5 to 32° F.

This agitation of the liquid in the chamber preferably is vigorous and continuous, acting in conjunction with the superatmospheric pressure condition in the chamber to prevent freezing of the carbonated beverage or the formation of any frozen particles or crystals thereof. The beverage will thus remain liquid so that its concentration will be completely uniform while its temperature will be desirably low and also uniform throughout.

To dispense the carbonated beverage so prepared, it may be drawn or tapped from the closed chamber at any suitable location for flow into a container, such as a drinking glass. The relatively high pressure within the chamber will facilitate the tapping operation, and as the beverage leaves the closed chamber and enters the atmosphere, it will immediately crystallize or freeze to some extent whereby the beverage delivered to the container will include both a liquid and a solid phase. Such freezing or crystallization is due primarily to the low temperature of the product and to the change in pressure in passing from the pressurized closed chamber to the atmosphere. Furthermore, since this crystallization or freezing occurs practically instantaneously, the frozen particles or the solid phase will include all the ingredients of the liquid phase in the same proportions. In other words, the frozen particles or solid phase so produced will not be of water alone but desirably will be of the same proportions and ingredients as the liquid phase.

Referring now to the drawing, an exemplary apparatus for preparing and dispensing carbonated beverages in the manner just described is indicated in FIGURE 1 by reference numeral 20. It is shown as including an outer housing or casing 22 in which there is mounted a vessel 24 defining a hermetically sealed chamber 26. The vessel 24 may be made of any suitable material, such as metal, mounted in the position shown by any appropriate structure, and, as shown, it may be in the form of a horizontal, right circular cylinder having front 28 and rear 30 end walls.

A cooling coil 32 is shown as being wrapped around the vessel 24 and an insulating sheath 34 having end walls 36, 38 is shown as enclosing the coil 32 and vessel 24. The cooling coil 32 communicates with an appropriate refrigeration device, such as a compressor-condenser-expander type refrigeration unit of known construction indicated schematically in the drawing and identified by numeral 40. Any appropriate cooling medium may be utilized to circulate through the cooling coil 32 for absorbing or withdrawing heat from within the chamber 26, as is understood.

A supply tank or container 42 for the mixture of the flavoring substance and water is indicated as being arranged externally of the housing 22. The flavoring substance and water within the tank 42 will be in the proportions desired for the final product. A cylinder 44 for the carbonating gas is shown as being arranged adjacent to the tank 42. As previously indicated, the carbonating gas may be carbon dioxide.

A conduit 46 leads from the tank 42 to a liquid pump 48 arranged, for example, within the housing 22 on a shelf 50, as shown. The outlet conduit 52 from the pump 48 leads to a preliminary mixing device or chamber 54 communicating with the gas cylinder 44 through the conduit 56. A pressure gauge 58 and pressure regulator 60 preferably are provided in operative association with the conduit 56 whereby the pressure of the carbonating gas delivered through this conduit can be regulated to a predetermined and constant value. An on-off valve 62 may be provided at the top of the cylinder 44 in known manner.

From the mixing device 54, a conduit 64 leads into the right hand end of the chamber 26, as shown. Any appropriate pressure relief valve 66 may be provided in conduit 64.

The chamber 26 is divided by a partitioning wall 68 into a front and a rear compartment, and, as shown, a shaft 70 is arranged within the chamber 26, extending through the partitioning wall 68, and suitably journalled in the end walls 28, 30, 36, 38 as by bearings 72, 74. Suitable fluid-tight seals will be provided in these end wall structures for the shaft 70. Agitating blades 76, 78 are fixedly mounted on this shaft 70 within the front compartment, for example, in diametrically opposed or any other desired relation, and a collar 80 is shown as being attached to the shaft 70 intermediate the partitioning wall 68 and the rear blade 78.

The shaft 70 is operatively connected to a source of power, such as prime mover 82. As shown, a pulley 84 is connected to the output shaft 86 of the prime mover 82, with a belt 88 being trained around this pulley and also around a larger pulley 90 carried by one end of a shaft 92, a smaller pulley 94 being carried by the other end of the shaft 92 and being drivingly connected to a larger pulley 96 on the rear end of the shaft 70 through the belt 98. The prime mover 82 may be mounted in the position shown by any appropriate structure such as that indicated by the numeral 100, while the shaft 92 may be journalled in bearing supports 102 mounted on a stationary base 104.

An outlet conduit 106 extends from the bottom of the front end of the vessel 24 through the end walls and terminates in a faucet-like construction 108 shown as being provided with a conventional, manually operable valve 110. A drinking glass 112 or other appropriate container is shown arranged on a base 114 underneath the faucet 108.

Means are provided for controlling the amount of flavored mixture delivered from the supply tank 42 by the pump 48. In the illustrative embodiment, this control means includes a pair of electrodes or probes 116, 118 mounted within an insulating member 120 extending through the sheath 34 and the cylindrical wall of the vessel 24 and terminating in the latter. Preferably, provision is made for adjusting the height of the electrodes 116, 118 within the vessel 24, and these electrodes are electrically connected to conductors 122, 124 which are in turn connected to power input lines 126, 128, as shown.

Power for running the pump 48 is received from the power lines 126, 128 by reason of electrical conductors 130, 132 shown as being connected to the power lines and to a motor for the pump 48.

In order to control the operation of the pump 48 in response to the level of liquid within the chamber 26, an electromagnet or solenoid 134 may be arranged in the conductor 124, as shown, with an armature 136 actuated thereby to open or close a switch 138 in the conductor 132 for the pump 48. The switch 138 may be normally closed until the liquid in the vessel 24 rises to a height sufficient to contact the tips of the electrodes 116, 118 whereby current will pass through the leads 122, 124 and the electrically conductive liquid in the vessel to energize the solenoid 134 and open the switch 138 thereby discontinuing operation of the pump 48. Lead wires 140, 142 are shown as connecting the prime mover 82 to the power lines 126, 128, while lead lines 144, 146 are shown as connecting the refrigerating unit 40 to the power lines.

A conventional thermostatic switch, generally indicated by numeral 148, is shown as being provided in the line 146 for regulating the operation of the refrigeration unit 40. This thermostatic switch may be in the form of a bi-metallic member, as shown, or may be of any suitable construction arranged at any desirable location within the housing 22, for example, in the position shown, or in contact with the vessel 24, or within the vessel 24, as desired.

An on-off switch 150 of any known construction may be provided for initiating or terminating flow of current through the power lines 126, 128.

To operate the exemplary apparatus just described, the switch 150 will be closed whereby the pump 48, prime mover 82, and refrigerating unit 40 will be actuated. The valve 62 will be opened and the flavored mixture and carbonating gas will thus flow from their respective sources through the conduits 46, 56 and into the mixing device 54 where the flavored liquid will be initially carbonated to some degree, after which the material will flow through the conduit 64 and into the rear compartment in the vessel 24. The pump 48 will continue operating until the liquid in the rear compartment rises to the height where it contacts the electrodes 116, 118 whereupon solenoid 134 will be energized to open the switch 138 and discontinue operation of pump 48.

The carbonating gas delivered from the cylinder 44 will be at superatmospheric pressure, for example, in the range of 12–18 p.s.i.g., as previously indicated, and will be delivered into the chamber 26 in an amount in excess of the amount necessary to completely carbonate the flavored liquid therein.

The carbonating gas and flavored liquid pass into the front compartment of the chamber 26 through the opening in the partitioning wall 68 to be agitated or stirred by the blades 76, 78. This agitation of the liquid, as well as the reduction in the temperature thereof effected through the cooling coil 32, promote optimum carbonation of the liquid within the vessel 24, as is understood.

The temperature of the liquid in chamber 26 will be reduced at least to its freezing point or slightly therebelow by the cooling coil 32, for example, to a temperature in the range of about 28.5 to 32° F., and the excess of the superatmospheric carbonating gas within the vessel coacting with the agitating action of the blades 76, 78 will operate to prevent freezing of any of the liquid. The blades 76, 78 preferably terminate in straight edges disposed adjacent to the cylindrical surface of the vessel 24, as shown, so as to be effective in preventing the formation or accumulation of any crystals or frozen particles of the liquid on the inside of the vessel walls.

When dispensing the carbonated liquid so prepared within the vessel 24, the valve 110 will be turned on and the liquid will pass through the conduit 106 and faucet 108 into the open container 112. As indicated heretofore, the liquid upon entering the atmosphere immediately partially freezes whereby the product in the drinking container 112 will be partially in the liquid phase and partially in the solid phase.

With the exemplary conditions in the hermetically sealed vessel 24, referred to heretofore, the amount of solid phase 154 in the beverage dispensed from the vessel into the container 112 desirably will be not less than approximately 50 percent of the total amount dispensed into the container. In other words, the drink in the container will be in the semi-frozen state, with some freezing thereof taking place even after the liquid enters the container.

After a dispensing operation, the liquid level within the vessel 24 will drop to cause the electrodes 116, 118 to be no longer immersed or submerged in the liquid. Solenoid 134 will then be deenergized whereupon the switch 138 will be closed and the pump 48 actuated to deliver additional flavored liquid from the tank 42 into the vessel 24 until the liquid level within the vessel rises again to a height sufficient to submerge the tips of the electrodes 116, 118 to energize the solenoid and deactivate the pump.

Suitable provision may be made for replenishing the supply of the flavored liquid mixture in tank 42 and the $CO_2$ gas in cylinder 44, or new tanks may be substituted therefor, as will be understood. An air vent at 156 may be provided for the tank 42, and an eduction tube 158 is shown as extending from conduit 46 into this tank for flow of liquid.

An orifice 160 preferably is located at the outlet side of the mixing device 54 to spray the liquid mixture and carbonating gas into the tube 64 thereby facilitating dispersion of the gas in the liquid to enhance the preliminary carbonation. If desired, the mixing device 54 may be mounted so that its outlet and the orifice 160 open directly into the vessel 24. Or, in some cases, the device 54 may be eliminated entirely, with both conduits 52, 56 leading separately and directly into vessel 24.

The front and/or rear end walls 28, 36 and 30, 38 respectively, and their covering end plates 162 may be made removable to permit access to the interior of the vessel 24 for cleaning purposes or for mounting or removing the shaft 70. In this connection, the front wall of the casing 22 is shown as including a removable portion 22' covering a hole therein through which the removable front structure including plate 162 and end walls 36, 28 may pass. It will be appreciated that appropriate seals, such as conventional O-rings (not shown) may be provided, for example, at the ends of vessel 24 and engaging the walls 28, 30 to provide fluid-tight joints. Similarly, the end wall structures will include appropriate sealing means engaging the conduits 64, 106 and shaft 70 whereby the vessel will be hermetically sealed.

If desired, the partitioning wall 68 may be eliminated and another agitator blade, similar to blades 76, 68, may be mounted on the shaft 70 in this region.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

I claim:

1. A method of producing a drink, comprising a liquid-phase and a solid-phase mixture wherein the solid phase is made up of a mass of tiny frozen particles distributed in the liquid to make the drink have the form of a slush, including the steps of: providing a liquid to constitute the drink in a closed container; charging the same with a gas to raise the pressure in the container above atmospheric pressure and to cause it to emit from the container as hereafter defined; chilling the mass in the container to a few degrees below the freezing point of water at atmospheric pressure, and to approximately the freezing point of the mass under the conditions within the container; and discharging the mass from the container into a receptacle at atmospheric pressure, thereby expanding the gas therein and causing freezing of some of the liquid emitting from the container into tiny solid particles within the remaining liquid phase, to form the slushy drink aforesaid as a consequence of the release of the mass to atmospheric pressure.

2. A method of producing a drink comprising a liquid-phase and solid-phase mixture wherein the solid phase is made up of a mass of tiny frozen particles distributed in the liquid to make the drink have the form of a slush including the steps of: providing a liquid to constitute the drink in a closed container, charging the same with a gas to raise the pressure in the container to above atmospheric, chilling the mass in the container a few degrees below the freezing point of water at atmospheric pressure, and to approximately the freezing point of the drink under the conditions within the container, agitating the mass within the container to restrain freezing of the mass onto interior walls inside the container and to maintain it fluid; and discharging it from the container into a receptacle at atmospheric pressure, and thereby expanding the gas therein and causing freezing of some of the liquid emitting from the container into tiny solid particles within the remaining liquid phase, to form the slushy drink aforesaid, as a consequence of the release of the mass to atmospheric pressure.

3. The method of claim 2, wherein the step of charging the liquid with gas comprises raising the pressure to approximately 12–18 p.s.i.g.

4. The method of claim 2 wherein the gas employed is carbon dioxide.

5. The method of claim 2 wherein the temperature in the container is reduced to about 28.5 degrees F.

6. The method of claim 2 wherein the liquid within the container comprises a flavored liquid that is essentially water, and the gas is carbon dioxide.

References Cited in the file of this patent

UNITED STATES PATENTS

| | | |
|---|---|---|
| 1,243,068 | Humphrey | Oct. 16, 1917 |
| 1,373,817 | Humphrey | Apr. 5, 1921 |
| 2,409,067 | Reed | Oct. 8, 1946 |
| 2,713,253 | Chandler | July 19, 1955 |
| 2,909,433 | Morrison | Oct. 20, 1959 |

OTHER REFERENCES

Textbook: "Fruit and Vegetable Juice Production," by D. K. Tressler and M. A. Joslyn, The Avi Publishing Co., New York, N.Y., 1954, pages 183 to 189.